United States Patent [19]

Zink et al.

[11] Patent Number: 5,492,195
[45] Date of Patent: Feb. 20, 1996

[54] MUFFLER TRAVERSED BY A FLUID

[75] Inventors: Dieter Zink, Wolfratshausen; Burkhard Stuber, Germering, both of Germany

[73] Assignee: Linde Aktiengesellschaft, Germany

[21] Appl. No.: 211,215

[22] PCT Filed: Sep. 18, 1992

[86] PCT No.: PCT/EP92/02156

§ 371 Date: Jun. 16, 1994

§ 102(e) Date: Jun. 16, 1994

[87] PCT Pub. No.: WO93/06588

PCT Pub. Date: Apr. 1, 1993

[30] Foreign Application Priority Data

Sep. 24, 1991 [DE] Germany .......... 41 31 777.7

[51] Int. Cl.[6] ............... F01N 1/08
[52] U.S. Cl. ............... 181/264; 181/268; 181/275
[58] Field of Search ............... 181/224, 229, 181/251, 257, 264, 268, 271, 275, 282

[56] References Cited

U.S. PATENT DOCUMENTS

| | | | |
|---|---|---|---|
| 1,067,467 | 7/1913 | Collins | 181/264 |
| 2,281,963 | 5/1942 | Tongeren | 181/264 |
| 3,018,840 | 1/1962 | Bourne et al. | 181/224 |
| 3,507,355 | 4/1970 | Lawson . | |
| 3,642,094 | 2/1972 | Yancey | 181/264 |

FOREIGN PATENT DOCUMENTS

| | | |
|---|---|---|
| 2201010 | 4/1974 | France . |
| 2112393 | 10/1971 | Germany . |
| WO9101034 | 1/1991 | WIPO . |

Primary Examiner—Khanh Dang
Attorney, Agent, or Firm—Evenson, McKeown, Edwards & Lenahan

[57] ABSTRACT

A muffler is described which is traversed by a fluid. Housing (1) contains sound-absorbent built-in components. The sound-absorbent components contain corrugated sheets (11, 12) instead of fibrous materials. (FIG. 3).

20 Claims, 5 Drawing Sheets

MUFFLER TRAVERSED BY A FLUID

The invention relates to a fluid flow muffler having a fluid flow housing with a plurality of built-in sound-absorbent components arranged in the flow direction.

In materials processing systems there are frequently sources of high noise emissions, for example machines such as expansion turbines or compressors. Especially in the blading of expansion turbines, narrow-band noise levels are generated which are transmitted without damping through the inlet and outlet lines and are radiated outward by connected steel structures. These acoustic emissions, which are conducted to a large extent through the fluid flowing through such machines, must be reduced to a tolerable level. In addition to structural measures on the machines themselves which have only limited effectiveness, mufflers flanged to the outlet and/or inlet of the machine are suitable for the purpose.

Previously known mufflers of the type described above contain fibrous materials as sound-damping components. Such devices provide satisfactory sound absorption in many cases, but disadvantages arise in practical operation. Known mufflers are in fact suitable only for specific processing conditions, and in particular limits are imposed on their use with respect to the aggregate state of the fluid and the operating temperature. They therefore do not work completely satisfactorily in many applications, especially as regards failsafe operation of the system and flexibility of the performance of the process.

Thus fibrous absorption materials have demonstrated breakup phenomena at low temperatures, like those encountered for example in expansion turbines in low-temperature air separation plants, and have led to damage to the expansion turbines. In addition, when fluid appears, for example during expansion in the wet steam area, the liquid phase is partially absorbed by fibrous materials and the damping effect is sharply reduced.

Therefore the object of the present invention is to provide a muffler of the type described above which is especially advantageous from the economic standpoint, as a result of its high failure safety, low wear, and versatility.

This goal is achieved in the muffler according to the invention by the use of corrugated sheets with an essentially rectangular shape in the sound-absorbent components. Folded aluminum foils are primarily, such as those employed as built-in components already in other areas of materials processing (for example in material exchange columns, heat exchangers, and similar apparatus). Such foils are easy and economical to manufacture, and do not suffer from the above-mentioned disadvantages of fibrous materials. In particular, they are stable even in the low temperature range and do not absorb liquid. The muffler according to the invention can therefore be used in an extraordinarily broad range of applications, even, for example, in the cold part of an air separation plant, the inlet and/or outlet of an expansion turbine. Even in the case when the fluid contains liquid components, in contrast to the known mufflers, no difficulties arise since the muffler according to the invention is manufactured without absorbent fibers.

Detailed calculations and comprehensive measurements have shown that the muffler according to the invention has a high absorption effect which corresponds at least to those of known devices. In particular, narrow-band noise emissions can be damped extraordinarily effectively.

Preferably the corrugated sheets of the sound-absorbent components are arranged in such fashion that the peaks and valleys of the corrugations run essentially perpendicularly to the flow direction of the fluid. As a result a high flow resistance in the flow direction, and a low flow resistance in a direction perpendicular thereto are achieved within the sound-absorbent components.

The use of corrugated sheets, consisting of a plurality of parallel strips arranged sequentially in the flow is especially advantageous. The corrugations of two adjacent strips are staggered with respect to one another so that gap-shaped openings are provided between each two adjacent strips.

Such strips, also referred to as cut fins, are manufactured in large quantities and in a wide variety for the construction of aluminum plate heat exchangers and are therefore simple and economical to manufacture. It has been found that this shape is especially suitable for sound absorption in a muffler according to the invention.

Depending on the special application of the muffler, perforated, unperforated, and uncut sheets or perforated and cut sheets, can be used advantageously. The combined use of different sheets is also possible.

In one embodiment of the invention, the amplitude (depths) of the corrugations of the sheet is tuned to the wavelength of the noise. The distance between the peaks and valleys of the rectangular shaped corrugations is then approximately equal to one-quarter of the wavelength of the sound to be absorbed. In practice, minor deviations of the absorption maximum from this theoretical value have been found, and exact tuning is done using absorption measurements.

Preferably the sound-absorbent components are formed as a plurality of flat baffles arranged parallel with one another. The corrugated sheets are arranged inside the baffles, which as a rule each have two cover plates between which one or more corrugated sheets are arranged. At least one of the two cover plates of a baffle has openings to conduct the noise into its interior, (in other words to the corrugated sheet or sheets). When a baffle contains more than one corrugated sheet, it can still suffice to make one of the two cover plates permeable to sound. In this case, no sound-permeable components need be provided between each two corrugated sheets, but only permeable separating grids, such as wire cloth for example.

In a preferred embodiment of the invention, two corrugated sheets are disposed between the cover plates of a baffle, with essentially sound-impermeable separating plate between the two corrugated sheets, of a baffle. The separating plate in this case can consist of a solid sheet with corresponding stability. It is advantageous when in this version of the muffler according to the invention, both cover plates are made permeable to sound, for example by using perforated sheets.

The two cover plates of a baffle can be joined by rivets, screws, welds, or similar connections. However it has proven to be especially advantageous to solder the two cover plates and the corrugated sheet or sheets of a baffle to one another. This technique provides a positive connection at every point of contact between the elements, so that the baffles exhibit extremely high stiffness and cannot be set vibrating even at high flowrates.

The baffles can be installed directly in the muffler, (that is, connected directly with the housing), which is especially advantageous for example in the case of limited clearances, since the entire interior of the housing can be used for damping. Since the housing as a rule is made roughly cylindrical, the height of the initially square baffles must be tailored individually and their upper and lower edges beveled in order to fit into the round housing. This results in a relatively high manufacturing cost.

If sufficient space is available, in another preferred embodiment of the muffler according to the invention, a structure with a rectangular cross section can be built into the housing to hold the baffles. The structure advantageously consists of four rectangular sheets installed lengthwise and serves to fasten the baffles. Its advantage consists in the fact that the baffles can all be made to the same dimensions and therefore, economically.

Preferably a bulkhead is provided in the space between the housing and the frame, which prevents fluid and especially noise from flowing through the space to the sound-absorbent interior of the frame. Therefore the fluid flows only in the interior of the frame.

The housing of the muffler is advantageously essentially cylindrically symmetrical with respect to an axis running in the flow direction and comprises the baffles and the frame. Its inside diameter must therefore be at least equal to the cross-sectional diagonals of the frame. The housing serves as a pressure-tight outer jacket for the muffler. The housing is preferably sealed acoustically by the frame holding the baffles.

In still another preferred embodiment of the invention, an inlet port and/or an outlet port with a circular cross section is likewise mounted symmetrically to the axis at the two ends of the muffler, the diameters of such ports being smaller than or equal to the larger side length of the rectangular cross section of the frame for fastening the baffles. For the transition between the circular and rectangular cross sections, transition guide plates are disposed between the inlet ports and the outlet ports and the baffles.

To optimize sound absorption, baffle may contain two or more superimposed corrugated sheets different amplitudes. Although the two superimposed sheets can have the same dimensions it is especially favorable when the corrugations of the two superimposed sheets have different amplitudes. By suitably tuning the sizes of the corrugated sheets, especially the amplitudes of the corrugations, the absorption effect can easily be adjusted to the emission spectrum of the noise source. Also, a plurality of peak levels at different frequencies can be damped.

It can also be advantageous in this connection if a wire cloth is located between two adjacent corrugated sheets of a baffle, which produces an exactly defined and stable position of the sheets relative to the adjacent sheets, without adversely affecting the acoustic permeability between the two sheets.

As a rule the baffles have essentially the shape of elongated flat rectangles. In a preferred embodiment of the invention each baffle is permeable to the fluid (and hence especially to noise) on exactly one side with this side running parallel to the flow direction and parallel to the course of the peaks and valleys of the corrugated sheet adjacent to it. The interior of the baffle is therefore connected with only one adjacent flow channel. Each baffle can also be composed of two or more segments along the axis of the housing, whereby in the segments of a baffle located sequentially in the axial direction the permeable surfaces can each be located on opposite sides.

For absorption of especially high frequencies, the baffles can also have corrugated sheets that are open to the flow on both sides. In this case a separating panel is fitted into the middle of the baffle and prevents the passage of sound waves from one gap being traversed by a flow into the adjacent gap.

In mufflers according to the invention the damping in the flow area can be so effective that the lengthwise conduction of the body noise through the housing constitutes the effect that limits the overall damping. Conduction of body noise can be significantly reduced by clamping a damping jacket over the housing.

Other objects, advantages and novel features of the present invention will become apparent from the following detailed description of the invention when considered in conjunction with the accompanying drawings.

DETAILED DESCRIPTION OF THE DRAWINGS

Figure 2:
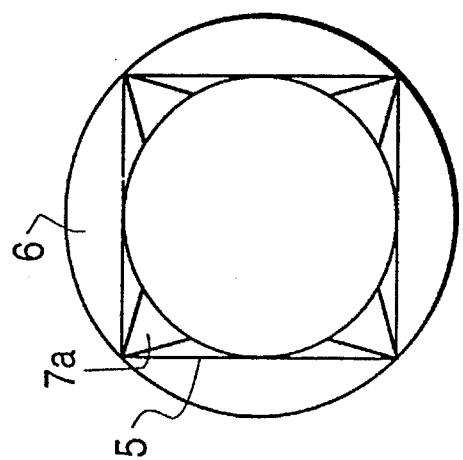
FIG. 2 is a cross section along line A—A in FIG. 1.
Figure 1:
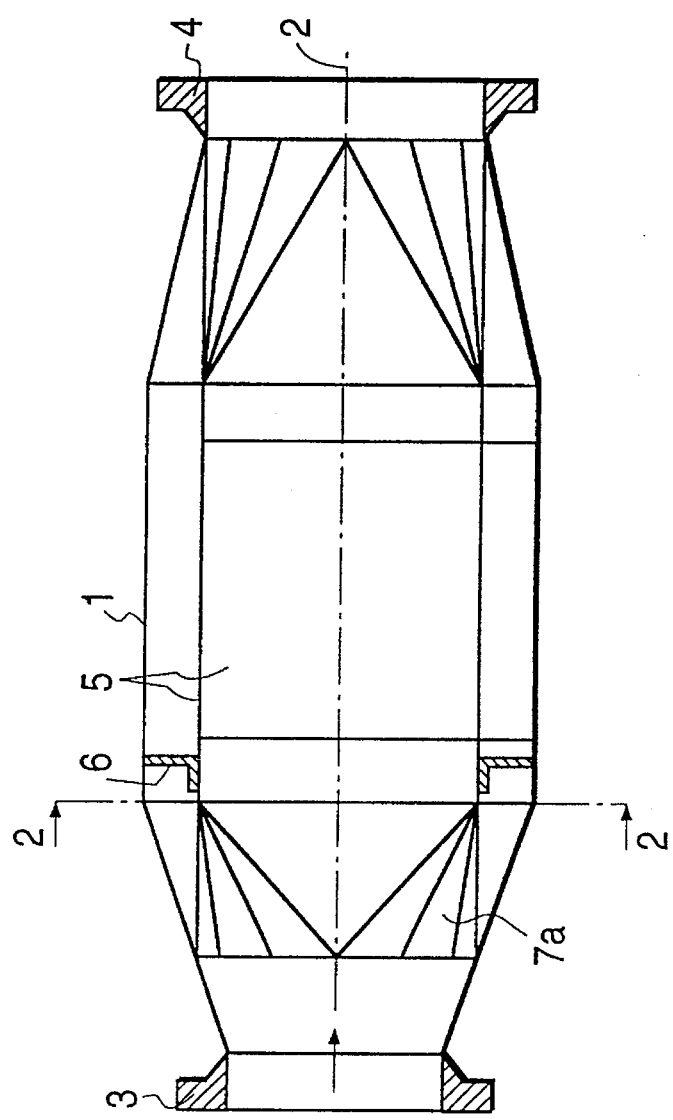
FIG. 1 is a lengthwise section through the muffler according to the invention with an internal frame, but without the baffles.

The schematic diagrams in FIGS. 1 and 2 show the basic design of the muffler according to a first embodiment of the invention. Housing 1 is cylindrically symmetrical around axis 2 and connected with an inlet stub 3 and an outlet stub 4. A frame 5 is built into housing 1, said frame being formed by four rectangular plates installed lengthwise. In FIG. 2 all four plates are shown in section; in FIG. 1 two of the plates are sectioned lengthwise and one can be seen that is perpendicular in a top view, while the fourth plate is not visible. The fluid flows only inside frame 5 and the space between it and housing 1 has no function other than the transition to the outer shell of housing 1, in the form of a cylindrical jacket, which ensures the pressure tightness of the muffler.

The diagonal of the square cross section of frame 5 in the embodiment has been selected to be equal to the inside diameter of housing 1. In other cases it may be advantageous to make the diagonal somewhat smaller. The inside diameters of inlet and outlet ports 3 and 4 in turn are smaller than or equal to the side length of the square cross section (equal to the plate width) of frame 5 in order to pose minimum resistance to the flow of the fluid through the muffler. A transition with a relatively low flow resistance between ports 3, 4 with a circular cross section and the interior of the muffler with a square flow cross section is ensured by transition guide plates 7a, 7b. In order to ensure that the noise cannot bypass the absorption section through the gap between frame 5 and housing 1, a bulkhead 6 is required that constitutes a connection between the frame and the housing that cannot be traversed either by fluid or by noise. Transition guide plates 7a, 7b have openings which ensure pressure equalization between the gap and the interior of frame 5.

Figure 3:
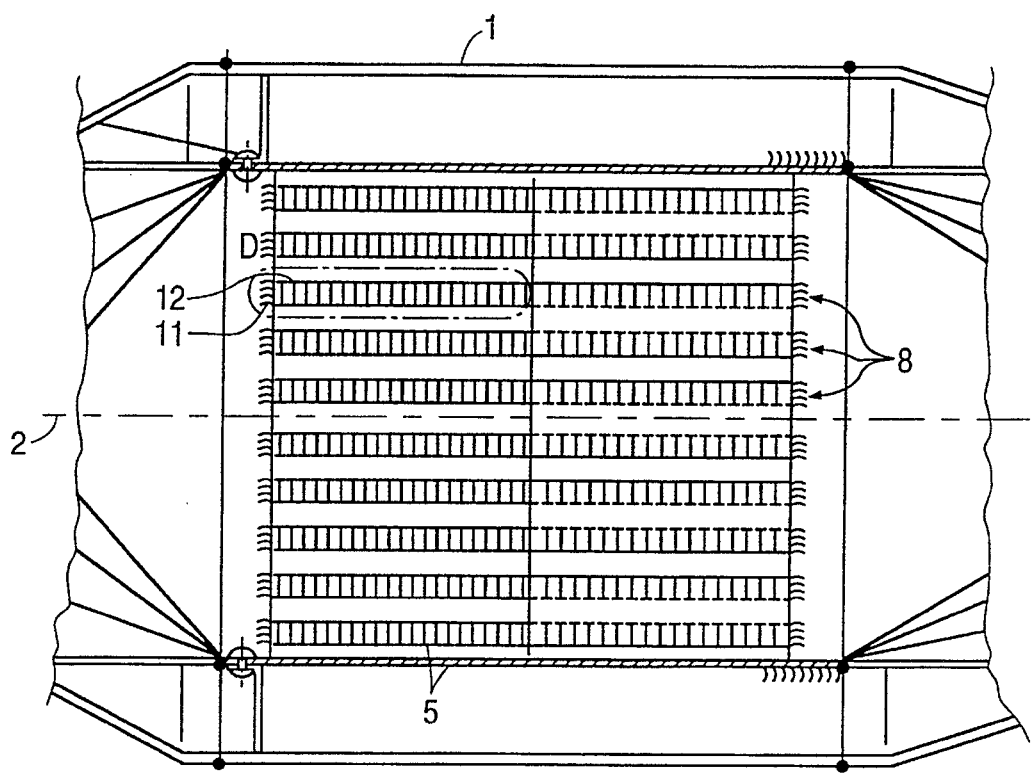
FIG. 3 is a detailed lengthwise section with the baffles installed.

In contrast to the schematic representations in FIGS. 1 and 2, FIG. 3 also shows sound damping baffles 8 arranged inside the square cross section of frame 5. As shown in the detailed drawing in FIG. 4, one baffle consists of two plane parallel cover plates 9, 10 which enclose layers (two in the present case) each composed of a corrugated sheet 11, 12. (It is also possible to have baffles with one such layers, or with more than two.)

The corrugated sheets are aluminum fins like those known from plate heat exchanger construction. In the case of cut fins each of the sheets is made up of strips running parallel to the plane of the drawing in FIG. 4 and whose corrugations are each staggered pairwise. Between the flanks of two adjacent strips there are gap-shaped openings that constitute an acoustic connection between the two partial chambers above and below the sheet. (In FIG. 4 only one strip is shown for the sake of clarity; the cut flanks of the adjacent strip which are actually visible in a front view have not been drawn.)

Figure 4:
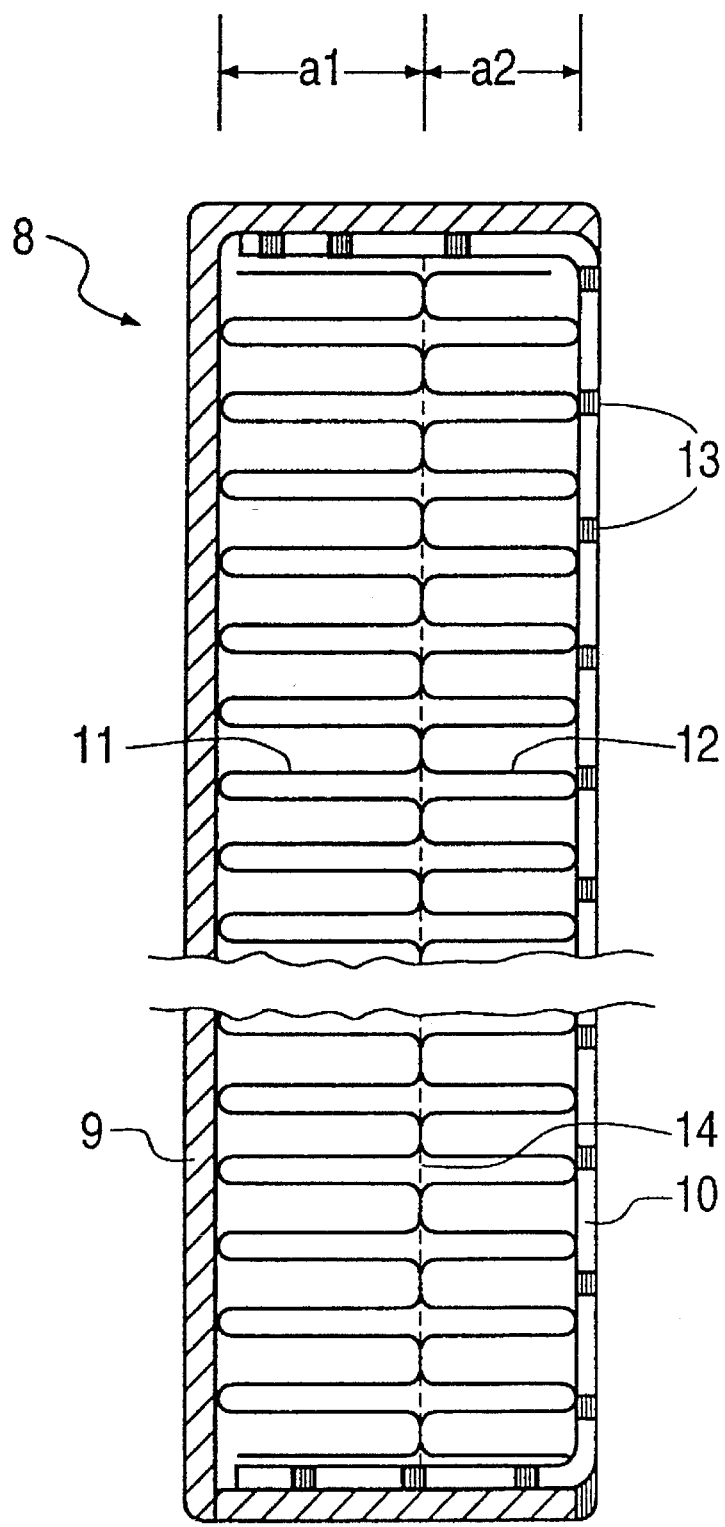
FIG. 4 shows detail D in FIG. 3.

When the two sheets are incorporated into a baffle it is important to align the sheets so that an acoustically continuous cavity is formed by a valley of one sheet and a peak of the sheet on top of it as shown in FIG. 4, such cavity extending essentially through the entire thickness of the baffle.

A wire cloth 14 is inserted between the corrugated sheets 11, 12 to ensure acoustic permeability.

As best shown in FIG. 4, the corrugations of sheets 11, 12 have a substantially rectangular cross sectional contour, with the respective sides of each peak and valley being substantially flat and parallel, so that each corrugation is characterized by an amplitude (depth) designated as $a_1$, $a_2$ in FIG. 4. The two corrugated sheets 11, 12 in the embodiment have different wave amplitudes. The distances between the peaks and valleys are as follows for example:

$a_1$=6.5 mm and $a_2$=9.5 mm.

The sound absorption maxima therefore are obtained with an acoustic wavelength of $4 \times (a_1+a_2)$=64 mm.

Figure 7:
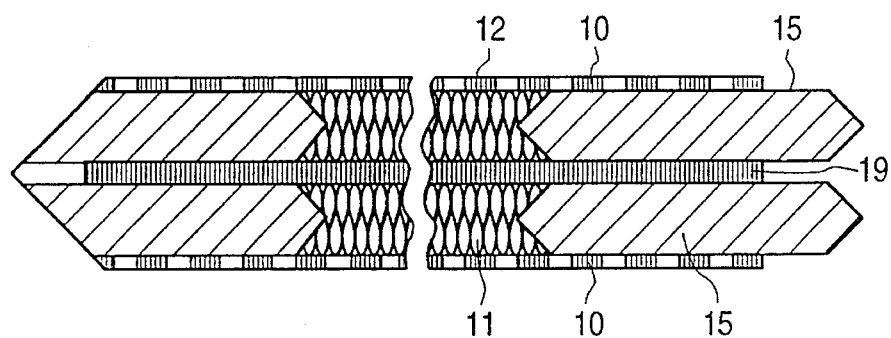
FIG. 7 is a baffle absorbent on both sides, in detail.

By incorporating different fins with suitable dimensions, the absorption spectrum of the muffler can easily be adjusted to the specific application. In addition, several peak levels can be damped simultaneously, by providing additional suitably adjusted baffles in the axial direction or using baffles absorbent on both sides with a separating panel located in the center (FIG. 7).

For example two or more segments of the muffler arranged sequentially in the flow direction can be provided with the first section having bilaterally absorbent baffles tuned to a first noise wavelength and the second section having baffles with another absorption maximum. In this way, the absorption spectrum can be adjusted practically at will to the special requirements.

Baffles 8 are sealed off on almost all sides. In one direction (at the top in FIG. 4) by an impermeable cover plate 9, on the inflow and outflow sides (left and right respectively in FIG. 4) by the crimped edges of cover plate 9, and laterally (perpendicular to the plane of the drawing in FIGS. 3 and 4) by the plates of frame 5.

Only on one side is there an acoustic connection to the space between baffles 8, namely through openings 13 and cover plate 10. Ordinary perforated sheet can be used for this purpose. The free passage area should be at least 30% (with a sheet thickness of 1 mm).

The perforated cover plates 10 (shown by the dashed lines in FIG. 3) in baffles 8, which are adjacent the flow direction, are arranged alternately on different sides (on top or on the bottom in FIG. 3). In the flow direction as well, each individual baffle 8 has two sections in which the permeable surfaces are each on different sides. This forms flow channels which are in acoustic connection with the interior of sound-absorbent baffles 8 for half their length on both sides and are also sharply delimited by nonpermeable cover plates 9.

Figure 5:
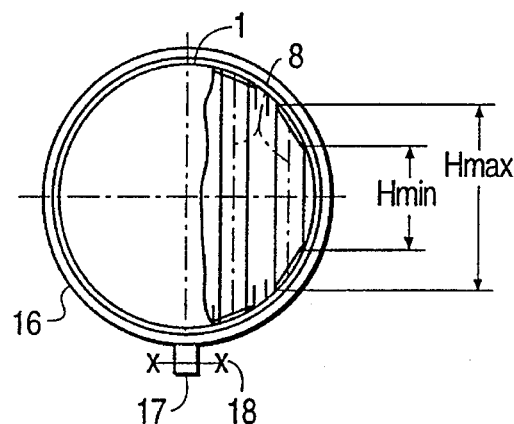
FIG. 5 is a cross section of another embodiment of a muffler according to the invention without a frame.
Figure 6:
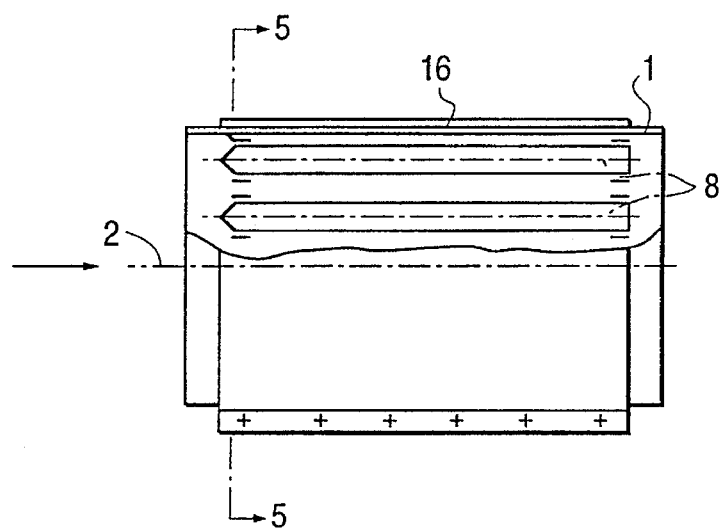
FIG. 6 is a lengthwise section of muffler without a frame in a lengthwise section.

Mufflers into which no frame is incorporated are shown in FIGS. 5 (cross section) and 6 (lengthwise section). The baffles 8, of which two are shown for example, must be cut depending on their location within the housing 1. The critical parameters for this are the heights $H_{min}$ and $H_{max}$ of the two cover plates of a baffle. To reduce the flow resistance, the baffles can terminate at the flow inlet in the shape of the peak of a roof.

The construction of a bilaterally absorbent baffle from two perforated cover plates 10, corrugated sheets 11, 12, a separating plate 19, and edge strips 15 is shown in FIG. 7. To achieve excellent strength and rigidity of the baffles it is advantageous to solder the corrugated sheets 11, perforated plates 10, a separating plate 19 which may be necessary, and edge strips 15 (side bars) with one another.

Figure 8:
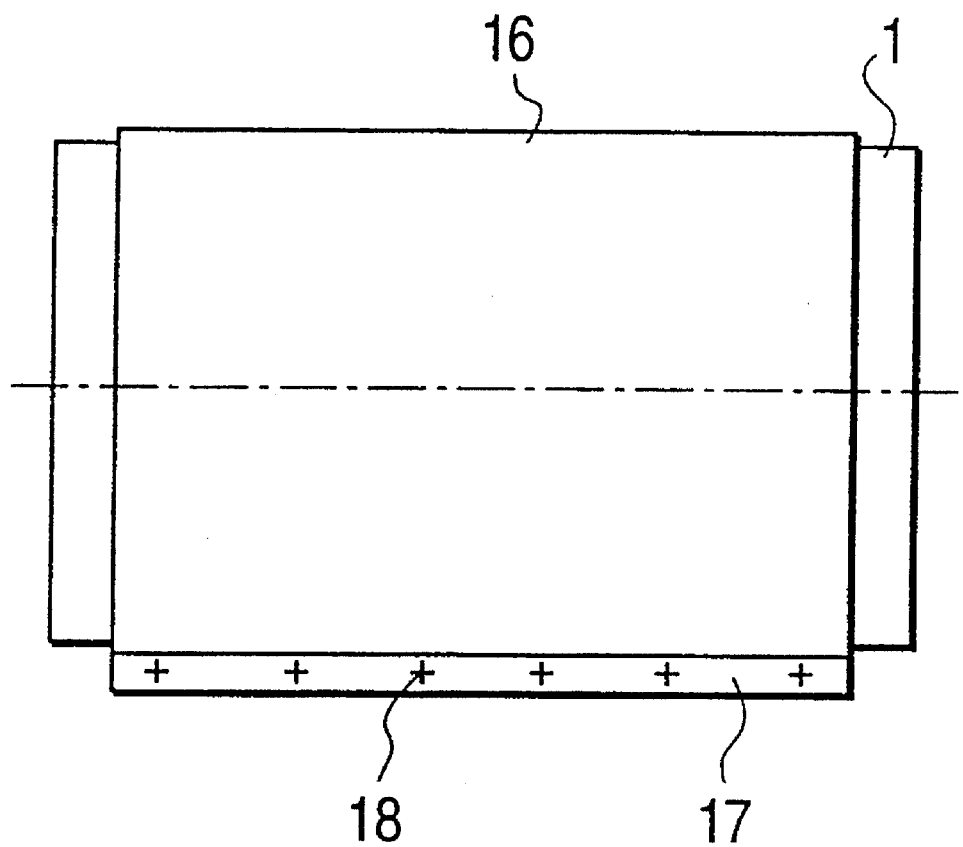
FIG. 8 is an outside view of an embodiment with a damping jacket.

At high absorption levels of the baffles, the optimum effectiveness of the sound reduction by the muffler cannot be realized fully because the lengthwise conduction of body noise through housing 1 is too high. To prevent this, the housing can be surrounded by a damping jacket (FIGS. 5 and 8). The thickness of the wall of the latter is about 0.2 to 1.0, preferably approximately half that of housing 1. It has a flange strip 17 by which damping jacket 16 can be clamped by screws 18 to housing 1.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Muffler for damping vibrations in a fluid flowing therethrough, comprising:

a housing; and a plurality of sound absorbent baffles arranged in said housing in a path of fluid flow therein;

each of said sound absorbent baffles comprising at least one corrugated sheet having corrugations which comprise longitudinally spaced alternating ridges and valleys each of said ridges and valleys having a longitudinal cross-sectional profile which is substantially rectangular.

2. Muffler according to claim 1, wherein said corrugated sheets are so arranged that respective ridges and valleys of said corrugations extend in a direction substantially perpendicular to a direction of said fluid flow.

3. Muffler according to claim 1, wherein said corrugated sheets comprise a plurality of adjacent corrugated strips, each strip having alternating ridges and valleys, and extending in said direction of fluid flow, and wherein ridges and valleys of adjacent strips are staggered with respect to one another, with gap-shaped openings between adjacent strips.

4. Muffler according to claim 3, wherein an amplitude of the corrugations is tuned to a desired noise wavelength which is to be damped.

5. Muffler according to claim 4, wherein said baffles are substantially flat.

6. Muffler according to claim 5, wherein each of said baffles has two cover plates arranged on opposite sides of said at least one corrugated sheet.

7. Muffler according to claim 6, wherein at least one of said cover plates has openings therein.

8. Muffler according to claim 6, wherein at least two corrugated sheets are disposed between the cover plates of said baffles, and a substantially noise-permeable separating plate is disposed between the two corrugated sheets of a baffle.

9. Muffler according to claim 6, wherein the cover plates and corrugated sheets of said baffles are soldered together.

10. Muffler according to claim 5, wherein said housing comprises a frame arranged in said path of fluid flow for supporting said baffles, said frame having a rectangular cross-section in a plane normal to said direction of fluid flow.

11. Muffler according to claim 10, wherein said housing has a cross-section in said plane, which differs from that of said frame, so that a space is defined between the housing and the frame, said muffler further comprising a gas tight bulkhead arranged in said space between the housing and the frame.

12. Muffler according to claim 10, wherein said housing is substantially cylindrically symmetrical with respect to a longitudinal axis running in the flow direction of fluid flow.

13. Muffler according to claim 10, wherein said housing has an inlet port and an outlet port, at least one of said inlet port and outlet port having a circular cross section with a diameter which is smaller than or equal to a side length of the rectangular cross section of the frame for mounting baffles.

14. Muffler according to claim 13, wherein transition guide plates are connected between the respective inlet port and outlet port and said frame for mounting baffles.

15. Muffler according to claim 5, wherein one baffle comprises two corrugated sheets arranged on top of the other, corrugations of said sheets having different amplitudes.

16. Muffler according to claim 5, wherein said baffles are permeable to fluid on at least one side, which runs parallel to said fluid flow and parallel to peaks and valleys of said corrugations.

17. Muffler according to claim 1, further comprising a damping jacket clamped over the housing.

18. Method of damping vibrations having at least one preselected frequency in a fluid flow generated by a machine, said method comprising the step of passing said fluid flow through a muffler having a plurality of vibration absorbent elements arranged in a muffler housing, said vibration absorbent elements comprising corrugated sheets having corrugations which comprise longitudinally spaced alternating ridges and valleys, each of said ridges and valleys having a longitudinal cross-section profile which is substantially rectangular.

19. Method according to claim 18, comprising the further step of providing said corrugations with an amplitude which corresponds to a wavelength of said preselected frequency.

20. A muffler for damping vibrations in a fluid flowing therethrough, comprising:

a housing defining a fluid flow path;

a plurality of sound absorbent baffles arranged in said fluid flow path in said housing;

each of said sound absorbent baffles comprising at least one sheet of corrugated material having a plurality of adjacent parallel extending corrugated strips, each of said corrugated strips having a succession of alternating transverse ridges and valleys along a length thereof;

ridges and valleys of adjacent corrugated strips being in alignment with each other, with sufficient difference of alignment to define gaps which provide an acoustic connection between adjacent peaks and valleys.

* * * * *